UNITED STATES PATENT OFFICE.

CHRISTIAN SHUNK, OF YOUNGSTOWN, OHIO.

IMPROVEMENT IN THE MANUFACTURE AND REFINING OF IRON.

Specification forming part of Letters Patent No. 14,257, dated February 12, 1856; Reissue No. 1,686, dated May 31, 1864.

*To all whom it may concern:*

Be it known that I, CHRISTIAN SHUNK, formerly of Slate Lick, in the county of Armstrong, State of Pennsylvania, now of Youngstown, Mahoning county, Ohio, prays for the grant of a reissue of his patent granted to him on the twelfth (12th) day of February, eighteen hundred and fifty-six, (1856,) the same being grounded on his application and specification which was filed in the Patent Office on the twenty-eighth (28th) day of August, eighteen hundred and fifty-four, (1854,) this his said application being accompanied with the required oath, according to the act of Congress in that case made and provided, together with the necessary petition and statement required.

The nature of my invention or discovery consists in the improvement of the manufacture of crude molten iron or pig-iron from ore in smelting-furnaces, and refining and converting the same, or of the remelted pig-iron into superior metal and grades of refined iron or steel through the employment and introduction of a current or currents of atmospheric air under pressure for removing from the crude metal a certain portion of carbon, combining the same with the oxygen of the air. The decarbonization thus produced has for effect a brisk ebullition of the molten metal, attended with great heat and increased fluidity. To this I superadd the use of common salt (chloride of sodium) as a flux, solvent, and purifier, to gain further fluidity by divesting the metal of sulphur and other contamination. A gallon-measure of the dry salt is a sufficient charge per ton of crude metal; and it should be remembered that, although the use of the article has been attempted in some forms of the iron business, I am not aware of its having been used in the way and to the end used by me. The flux may be applied at or near the hearth of the blast-furnace by effecting the introduction through the tuyere-pipe by the pressure and force of the blast, or the salt can be applied to the metal in the refining-fire or crucible when the converting process is commenced.

The refining and steel-producing blast for the conversion of crude metal into ingots can be applied at the smelting-furnace after a sufficient deposit has accrued; but it were preferable to transfer the molten iron to an outside crucible or converting-fire appropriated to the operation of refining—*i. e.*, to constitute a refining apparatus.

The crucible so to be employed I make of plate-iron, lined inside with best quality of fire-brick, or with any inconsumable material, in order to resist the action of the metal, and the whole to be established a convenient distance from the supply-furnace and to suit local circumstances. The refined metal may either be tapped off near the bottom of the refining apparatus or made to pour out into the ingot-molds. The metal can be discharged into the refining-fire or crucible by a conductor leading from the furnace-hearth.

The converting fire or apparatus thus described, being duly charged with crude molten metal, the process of refining consists in starting an air-blast under high pressure into the liquid metal, which at once kindles a blaze and extending through the whole mass, filling the upper part and throat of the vessel with flame occasioned by the oxygen of the air, consuming a portion of carbon from the iron. The workmen derive a clue to the progress of the combustion from the gradual decline in the amount of flame developed. For instance, it is estimated that when an appreciable decline sets in the quality of the metal is that of refined iron or hard steel, but when the flame is about to cease the product is low or semi steel of good tensile strength to mold into ingots, fit to be hammered or rolled; or the carbon can be reduced still lower by continuing the blast of air a few seconds longer, then by adding a given amount of highly carbonated pig metal, chipped or broken fine, the carbon will rise again in a state of combination of hardness, according to the amount of carbon added. This new supply of carbon is introduced a few minutes after the blast is discontinued, to allow time for the metal to cease boiling. The carbon is then immediately imbibed through the fluid mass in a combined state for molding into ingots.

One thousand cubic feet of air per minute, under a pressure of seven pounds, will refine and convert one ton of crude molten metal in from eight to ten minutes. The aggregate pipe section or aperture for discharging the stated amount of blast at seven pounds pressure is three square inches.

Refined iron or steel contain three-fourths of one per cent. to one and a half per cent. of carbon in a combined state, according to quality and hardness. By continuing the air-blast some minutes longer, and thereby reducing the carbon below that of refined iron or steel, the metal will begin to set and granulate, fit to form into balls in the usual way to form blooms for bar-iron.

If the hearth of the furnace is used for the refining operation, the tuyere-pipe can be introduced at one of the tuyere-arches or in front under the tymp-stone E, through an aperture in the dam-plate G, and made to dip down into the metal for the discharge of the air; but, as already stated, it is preferable to take the metal from the smelting-furnace and place it in a converting fire or vessel for refining and converting into ingots for forging purposes. In this converting process I use one-half of one per cent. to one per cent. of manganese. This article is not new in the iron business.

My refining tuyere-pipes I make of any inconsumable material.

Before the refined metal is tapped from the crucible it must stand a few minutes to allow the dross to rise to the surface before it is filled in the ingot-molds.

The air-blast can be introduced into the refining-vessel in different ways to penetrate the metal, to combine the air with the carbon of the crude iron to effect the refining and converting process.

In the manufacture of metal in the blast-furnaces I find it desirable to subject the ore to slow roasting at the entrance of the stack or tunnel-head of the blast-furnace by making that part the widest, or funnel-shaped outward, causing the descent there to be as slow as convenient, thereby affording time for accumulation of heat, and with the large surface of ore exposed, gradual expulsion from the mineral of volatile impurities, such as sulphur, arsenic and phosphorus, and a superior carbonated and pure molten metal is produced for refining and converting purposes.

This completes the description of my improvements in the manufacture of iron and refined iron or steel; and I wish to be understood that the details presented are not to be regarded as limiting me in respect to the use of what is otherwise new in my mode or modes of operation.

Blowing air into the refining or run-out fire with the use of coal for fuel has been practiced before.

What I claim as my invention, and for which I ask Letters Patent, is—

1. The manufacture and refining of crude iron by the several processes herein set forth and described.

2. Refining cast-iron through compressed air by diffusing the same, so as permeate the liquid mass of the iron.

3. The employment and application of common salt, as stated.

These claims I make jointly and separately in the manner and for the purposes substantially as specified.

CHRISTIAN SHUNK.

Witnesses:
CHAS. DU BOIS,
T. SCHESTLIN.